Figure 1:
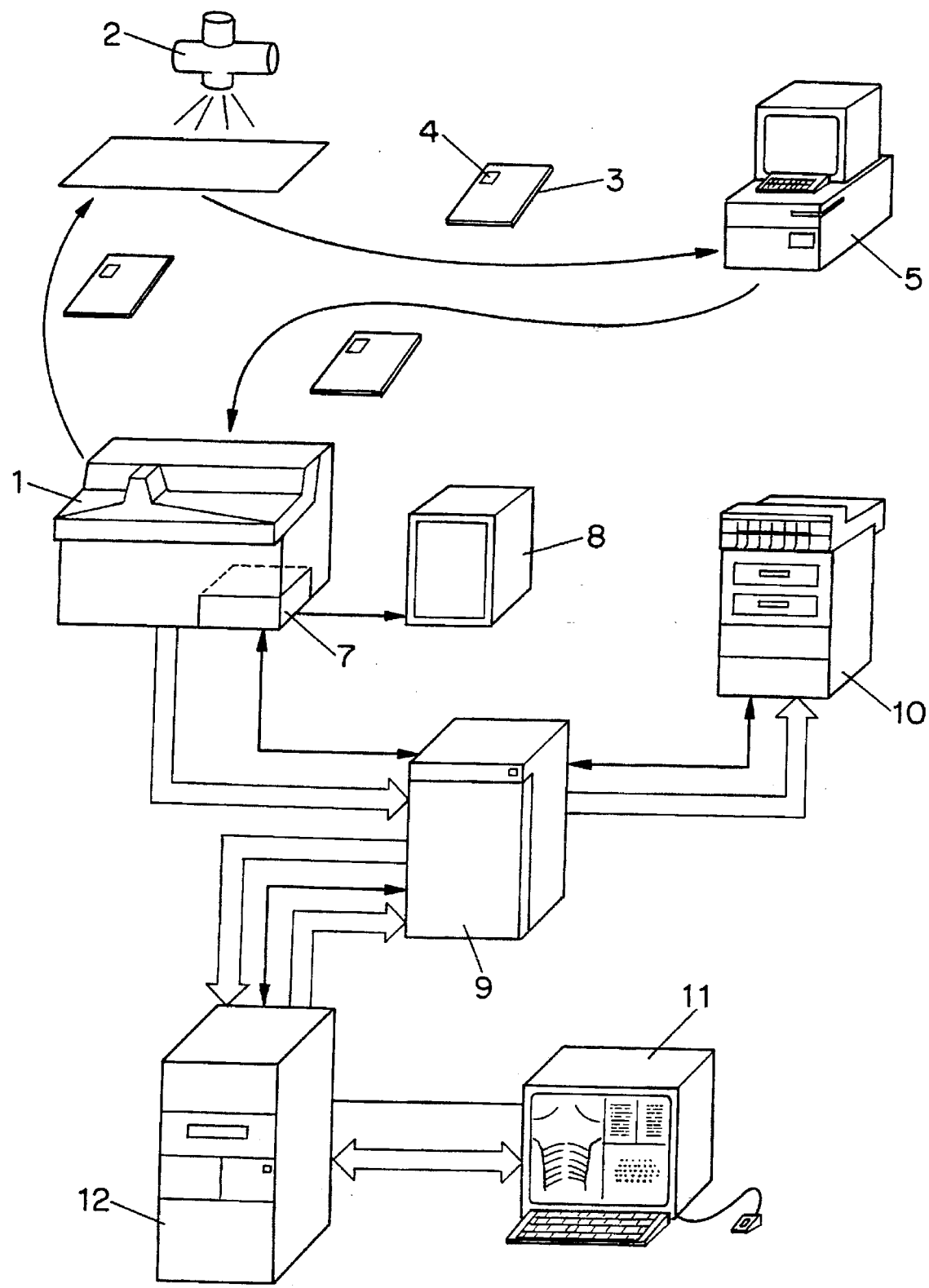

United States Patent [19]
Riet

[11] Patent Number: 5,652,776
[45] Date of Patent: Jul. 29, 1997

[54] REPRODUCTION OR DISPLAY OF MEDICAL IMAGES WITH CONFIGURABLE TEXT BOX

[75] Inventor: Willem Van Riet, Bonheiden, Belgium

[73] Assignee: Agfa-Gevaert N.V., Mortsel, Belgium

[21] Appl. No.: 641,068

[22] Filed: Apr. 29, 1996

[30] Foreign Application Priority Data

May 1, 1995 [EP] European Pat. Off. ............ 95201119

[51] Int. Cl.$^6$ .................................................. G01N 23/04
[52] U.S. Cl. .............................................. 378/62; 250/369
[58] Field of Search ................. 378/62, 63; 250/362, 250/363.01, 369, 370.09, 909; 364/413.22

[56] References Cited

U.S. PATENT DOCUMENTS 5,241,472   8/1993   Gur et al. ........................ 364/413.22
5,293,313   3/1994   Cecil et al. ...................... 364/413.22

*Primary Examiner*—Michael J. Tokar
*Assistant Examiner*—David Vernon Bruce
*Attorney, Agent, or Firm*—Brumbaugh, Graves, Donohue & Raymond

[57] ABSTRACT

Method and system for reproducing or displaying a medical image with a text box having a lay out that can easily be adapted to the specifications of the customer. A file comprising parameters relating to the lay out of a text box is downloaded into a storage unit, part of an image acquisition station or a workstation, the parameters are selected from the file and used for the composition of the text box to be reproduced on a hard copy of said medical image or to be displayed on a soft copy of the medical image.

6 Claims, 2 Drawing Sheets

5,652,776

REPRODUCTION OR DISPLAY OF MEDICAL IMAGES WITH CONFIGURABLE TEXT BOX

1. FIELD OF THE INVENTION

The present invention is in the field of digital radiography and more specifically relates to a method and an apparatus for configurating a system for reproducing or displaying medical images.

2. BACKGROUND OF THE INVENTION

In conventional radiography where an X-ray image of a patient is produced by exposing a radiographic film to X-rays transmitted through a patient, several identification items are produced on the film such as a patient's identification items, the hospital's name, an identification of the radiologist, an examination type identification etc. These identification data are first produced on an identification card. Then, a dedicated location on the radiographic film is exposed to the image of the card in an identification camera.

Recently a wide variety of new image acquisition techniques that render a digital representation of an image have been developed. For many examination types these techniques have gained a lot of importance.

Among these new techniques are computerised tomography, nuclear magnetic resonance, ultrasound, detection of a radiation image by means of a CCD sensor or a video camera, radiographic film scanning etc.

Still another technique has been developed wherein a radiation image, for example X-rays transmitted by an object, is stored in a screen comprising a photostimulable phosphor such as one of the phosphors described in European patent application 503 702 published Sep. 16, 1992 and in U.S. Ser. 07/842,603.

The procedure for reading out the stored radiation image consists of scanning the screen with stimulating radiation, such as laser light of the appropriate wavelength, detecting the light emitted upon stimulation and converting the emitted light into an electric representation for example by means of a photomultiplier.

This technique further comprises digitizing and processing said electric signal.

After read-out of the image stored in the photostimulable phosphor screen, one disposes of an electric (e.g. digital) image representation that can be applied to a monitor for display of the corresponding visual image.

The digital image representation of a medical image that is acquired by one of these techniques can further be applied to a recorder for recording a hard copy image, for example on film. This hard-copy can be viewed on a lightbox for diagnostic purposes.

Also in case of reproduction of an image acquired by one of these 'digital' acquisition techniques it is common practice to provide a text box on the film. Commonly several identification data such as the name of the hospital and of the radiologist, specifics on the patient such as the patient's name and identification number, are reproduced on a dedicated location on the hard copy. Often also data that are relevant with regard to evaluation of the image acquisition and image processing, for example processing parameters, minimum and maximum density etc. are reproduced in the text box on the hard copy.

The lay out of these text box is fixed in the systems that are on the market nowadays. This means that one lay out has been selected and installed and that this lay out cannot be changed to meet the customer's specifications, in casu the specifications of the staff of the hospital where the image acquisition and reproducing device has been installed.

However, hospitals and radiologists often demand for a very specific lay out of the text box.

They would either like to have a text box that has a similar lay out as the text box they were used to work with in conventional radiography systems or they have very specific desires.

These very specific desires are different from country to country. For example, in a country such as Sweden where many people have the same surname and the same christian name, more importance is given to a patient's identification number than to his name and hence the hospitals in Sweden often desire that the patient's identification number is reproduced in a more notable way in the text box than are the other items.

The reproducing systems that are on the market nowadays do not provide such features.

Further, also on display devices such as monitors, a displayed image is often provided with a text box. The above described reflections relating to text boxes on hard copy images apply also to text boxes on soft copy images.

3. OBJECTS OF THE PRESENT INVENTION

It is an object of the present invention to provide a method and a system for reproducing or displaying a medical image provided by a digital signal representation, wherein the layout of the reproduction or the display, and more specifically of the text box, is customized to the client's desiderata.

It is a further object to provide such a system that is easily adaptable to changed customer's desiderata.

Further objects will become apparent from the description hereafter.

4. STATEMENT OF THE PRESENT INVENTION

To achieve the above objects, the present invention provides a system for reproducing a medical image represented by a digital signal representation comprising an image acquisition station for providing a digital signal representation of a medical image, an image processing station for carrying out image processing on said digital signal representation;

a reproducing station connected to said processing station for generating a hard copy of a medical image, characterised in that the system further comprises storage means for storing a file comprising a configuration parameter set, selection means for selecting from said file parameters that relate to the lay out of a text box to be printed on a hard copy of the medical image, control means for controlling the operation of the reproducing station so as to generate a hard copy of said medical image with a text box the lay out of which is controlled by the selected parameters.

The invention additionally provides a system for displaying a medical image represented by a digital signal representation comprising an image acquisition station for providing a digital signal representation of said medical image, an image processing station for carrying out image processing on said digital signal representation;

a display station connected to said processing station for generating a soft copy of a medical image, characterised in that the system further comprises storage means for storing a file comprising a configuration parameter set, selection means for selecting from said file parameters that relate to the lay out of a text box to be displayed together with the soft copy of the medical image, control means for controlling the operation of the display station so as to generate a soft copy of said medical image with a text box the lay out of which is controlled by the selected parameters.

The fact that the lay out of the text box is defined by means of a parameter set provided in the form of a file implies that the lay out can easily be adapted to the customer's specifications. This can be obtained by simple amendment of the parameters in the file.

Further, since the same file can be stored in the acquisition station as well as in a workstation, consistency of the lay out of the text box can be obtained indefinite of the origin of the image (processed by the acquisition station or by a workstation).

In a specific embodiment the image acquisition station is a system for reading a radiation image that has been stored in a photostimulable phosphor screen. The image acquisition station then comprises means for scanning said screen with stimulating irradiation, means for detecting light emitted by the photostimulable phosphor screen upon stimulation, means for converting the detected light into an electric signal representation.

Other image acquisition stations that render a digital representation of a medical image such as those mentioned in the introductory part of the description are suitable alternatives.

In one embodiment the image processing station is a processing unit incorporated in the image acquisition station. This processing unit then performs on-line image quality enhancing processing such as contrast enhancement, noise reduction etc. and also image processing that does not change the contents of the image but that affects the outlook of the image. Among the latter processing is the addition of a text box to the radiation image.

In another embodiment the processing station is a work station that is connected to the image acquisition station. A digital signal representation acquired by the image acquisition station is then fed into the work station and stored for later processing.

In a specific embodiment the processing station comprises means for decomposing the acquired digital image representation into a multiresolution representation comprising detail images at multiple resolution levels and a residual image at a still lower resolution level. The decomposition is such that a reconstruction algorithm exists such that when it is applied to the unmodified detail images of said multiresolution representation and to the residual image, the original image or a close approximation thereof would be obtained.

The processing station further comprises means for processing the detail images by application of a modifying function to the pixel values of at least one of the detail images.

The multiresolution representation is then applied to the work station where it is stored. At any time the stored multi-resolution representation can be retrieved from the memory of the work station for processing or re-processing and reconstruction of the processed image. At this point of time a text box can be added the lay out of which is controlled by taking into account the parameters defining this lay out that are selected from the above-mentioned file comprising the configuration parameter set.

By the term 'a configuration parameter set' is meant a parameter set that at least comprises parameters that define the layout of the text box that will be reproduced on each generated hard copy.

The parameter set may further comprise other parameters that relate to the configuration of the system such as data on the specific configuration of devices installed by a customer, i.e. a list of connected hardware etc.

In one embodiment, the means for storing a file comprising a configuration parameter set may be part of the image acquisition station.

In an alternative embodiment these means for storing a file comprising a configuration parameter set are part of a workstation that is used for processing images before they are transmitted to a recorder for hard copy recording.

Preferably means for storing a file comprising a configuration parameter set are present in both the image acquisition station and the workstation so that a text box can be added to the radiation image in either of the devices and that an image with a text box can be reproduced when the image is directly sent from the image acquisition station to the recorder (or display device) or from the workstation to the recorder (or display device).

Most conveniently the file comprising the configuration parameter set is generated in advance on a personal computer and stored on a floppy disk. The file is then copied from the floppy disc into the storage means provided in the image acquisition station or in the workstation. Alternatively it is downloaded into said storage means.

The invention is advantageous in that it is possible to copy or download the same file into an image acquisition station and into a workstation that can be a stand alone workstation or a workstation connected to the image acquisition station.

This feature provides that the stations operate in a consistent way. By not cloning the info.nation, the use of identical parameter settings is guaranteed, and therefore this results in exactly the same processing when the image would be processed on-line or off-line. In this way hard copy images that are transmitted to the image recording device directly from the image acquisition station and images that are processed in the workstation and transmitted from the workstation to the image recording station will have a text box with an identical lay out.

Means are provided that select the parameters that are required for the operation of the recorder (or display device) so as to generate the text box with the specific lay out requested by the customer.

These means perform a so-called parsing operation. Parsing is a process whereby pure alphanumeric information contained in the configuration parameter set is read and converted into elementary memory entities stored in a station.

In case a system comprises a workstation in addition to an image acquisition station, the parsing process is executed independently in each of the stations in a generic data driven manner, and followed by a specific information extraction process.

Alternatively configuration data could be transferred via network or DICOM.

The parameter sets are organized as tables, each having a header section, a structure section and a data section. The parameter sets have the data stored in the data section and the corresponding syntax and semantics stored in the structure section.

The parsing process involves memory allocation for each of the parameters, syntactic analysis according to the syntax specified in the structure section, and error reporting upon incorrect syntax or other failure.

The syntax and semantics to which the data adhere is covering all possible format and dimensionality of the data, allowed range for the data and default value.

The specific interface routines on each of the platforms convert the stored elementary entities to whatever needed parameters for subsequent use by the system.

In a specific embodiment the parameters that relate to the lay out of the text box to be reproduced on a hard copy or soft copy of the medical image are the following: start positions of items in a line, name of an item, number of characters reserved for a specific item, etc.

Means are further provided for controlling the operation of each of the stations in accordance with the parameters selected from the configuration parameter set.

A bit map of the medical image and the text box information is composed and sent to the recorder for hard copy recorder or to the display station for display.

In another aspect the present invention relates to a method of reproducing or displaying a medical image represented by a digital signal representation and a text box comprising the steps of storing a file comprising parameters defining the lay out of a text box, selecting said parameters from said file, acquiring a digital signal representation of said image, processing said digital signal representation and generating a text box in accordance with said parameters, controlling the operation of a reproducing device or a display station so as to reproduce or to display said medical image together with a text box.

4. BRIEF DESCRIPTION OF THE DRAWING

Figure 2:
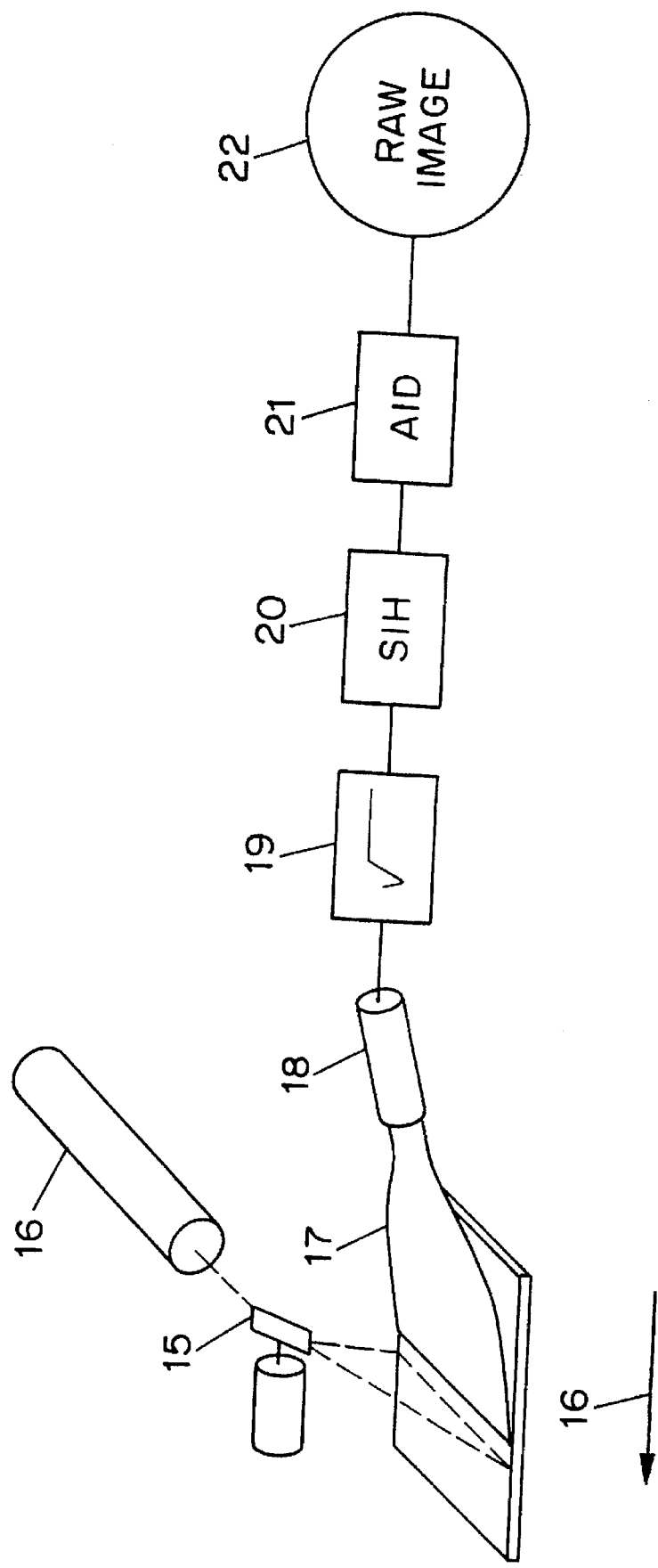

Particular aspects of the present invention as well as preferred embodiments thereof will be illustrated by means of the following drawings in which FIG. 1 is a general view of a system in which the method of the present invention can be applied, FIG. 2 shows an apparatus for reading an image stored in a photostimulable phosphor screen,

5. DETAILED DESCRIPTION OF THE DRAWINGS i) radiation image recording

A radiation image of an object was recorded on a photostimulable phosphor screen by exposing said screen to X-rays emitted by an X-ray source (2) and transmitted through the patient (not shown). The stimulable phosphor screen was conveyed in a cassette (3) provided with an electrically erasable programmable read only memory (EEPROM) (4).

ii) identification of radiation image

On entry of an exposed cassette in an identification station (5) a number of selections were made on a displayed list of radiologists, examination types and examination sub-types.

Then, patient identification data as well as keys relating to the selected items were written onto the EEPROM provided on the cassette conveying the photostimulable phosphor screen.

The following information was written onto the EEPROM: Cassette identification, cassette initialisation date, screen type, terminator and checksum for initialisation data, cassette usage count, acquisition number, patient name and first name, patient identification number, image processing menu key string, image position, exposure class, comment string, name of radiologist, examination type, examination sub type, session number, sequence number, number identified/session, sex, date of birth, number of copies, archive code, erasure time, terminator and checksum for identification data.

iii) image read-out

Next the cassette was fed into a radiation image read-out apparatus (1) where the information stored in the EEPROM and the image stored in the photostimulable phosphor screen were read-out. The cassette conveying the screen was opened and the screen was taken out of the cassette and conveyed to a read out section where the radiation image was read out.

The read-out method is illustrated in FIG. 2. The stored image was read-out by scanning the phosphor screen with stimulating rays emitted by a laser 14. The stimulating rays were deflected into the main scanning direction by galvanometric deflection means 15. The sub-scanning was performed by transporting the phosphor screen in the sub-scanning direction indicated by arrow 16. The stimulated emission was directed by means of a light collector 17 onto a photomultiplier 18 for conversion into an electrical image representation. The sensitivity adjustment of the photomultiplier was performed depending on the exposure class which was entered at the identification station.

Next, the signal was amplified by square root amplifier 19, sampled by a sample and hold circuit 20, and converted into a 12 bit signal by means of an analog to digital convertor 21.

iv) on-line image processing

The digital raw image signal 22 was sent to the image processing module of the read-out apparatus (FIG. 1, numeral 7) where it was stored in an internal buffer.

In image processing module (7) the digital image signal was subjected to a decomposition into detail images at multiple resolution levels and a residual image.

These detail images and residual image were then transmitted via a buffer (9) from the image processor to the image workstation 11, 12 via a digital communication channel where they were stored on hard disk.

The read out image signal was also applied to a preview monitor 8 for display immediately after read-out providing the operator with an early feed back on the performed exposure.

Display on the preview monitor was performed in accordance with the display method disclosed in European patent application EP-A-567 174 and EP-A-567 176.

The pixel values of the detail images were then modified in the on-line processing unit (7). This image processing serves various purposes among which are contrast enhancement, noise reduction etc.

The on-line processing (modification of the pixel values of the detail images) was preformed in accordance with an identifier indicative of an examination type, examination sub-type and radiologist read out of the EEPROM and the corresponding parameters selected by parsing a customized image processing parameter set that had been downloaded in advance. A 'customized image processing parameter set' is a parameter set that comprises image processing parameters to be attached to one or more examination types and subtypes of interest to the user of the read out system.

The modification of detail images was then followed by a reconstruction of a processed image. The reconstructed image was obtained by applying the inverse of the decomposition procedure to the modified detail images and the residual image, the reconstruction process being such that when it would have been applied to the unmodified detail images and the residual image this would have resulted in the original unprocessed image or a close approximation thereof.

The applied image processing has been described in extenso in European patent applications EP-A-527 525 and EP-A-610 604.

v) hard copy recording of on-line processed image

In one embodiment the on-line processed image was transmitted from processor (7) to a hard copy recorder (10).

Prior to the recording a bit map was generated in processing unit (7) comprising the bit map representation of the medical image and the bit map representation of the text box.

The text box was composed in processing unit (7) in accordance with the lay out parameters that were selected out of a file comprising configuration parameters.

The file comprising the configuration parameters was generated in advance and downloaded into the image processing module of the image read out apparatus. Next, a parsing program and specific interface routines were run to select the necessary parameters for controlling the lay out of the reproduction.

The lay out of the text box is as follows:

The text box consists of four lines. The contents and the lay out of three of these lines can be adapted to the specifications of the customer by amending lay out parameters in the configuration parameter file.

With regard to these lines the configuration parameter file comprises the following: the start position of text in each of the lines expressed in mm from the left border of the reproduction, the name of the items, the maximum number of characters reserved for an item.

The fourth line is fixed, it cannot be configurated according to the customer's desires. This line comprises parameters that described the settings used for image read out and image processing as well as parameters that relate to system management.

vi) off-line processing in work station

The read-out apparatus 1 and processing module 7 were connected to a workstation 11 and associated review console 12 where off-line processing was performed.

As has already been explained hereinbefore, the multi-resolution representation of the image was also transmitted to this workstation where it was stored on disc.

The multi-resolution image representation could be retrieved from memory at any time to be subjected to further processing or reprocessing.

For the purpose of setting image processing parameters for the off-line processing, the data read from the EEPROM have accompanied the image to the workstation and image processing parameters retrieved from a database stored by the workstation were used. The data stored in said database were obtained by parsing a customized parameter set.

Then, a text box was added in a similar way as described with reference to the on-line processing. The same configuration file as was downloaded into the read out device, was also downloaded into the memory of the workstation so that the same parameters for the layout of the text box could be used when reproducing a radiation image that had been processed on the workstation.

The image that was processed on the workstation could then be applied to the recorder for hard copy recording.

vii) hard-copy recording of off-line processed image

From the workstation the bit map of the image and the text box could then be applied to the recorder for hard copy recording of the radiation image with a text box the lay out of which was configurated in accordance with the customer's specifications.

viii) image recorder

An example of suitable recorder is a laser printer marketed by Agfa-Gevaert N.V. under the trade mark Matrix LR 3300. Another suitable example is the MATRIX COMPACT L, also marketed by Agfa-Gevaert N.V.

These laser printers are suitable for recording the radiographic images generated by a digital radiographic system, or generated by other digital diagnostic techniques such as CT, MR and DSA.

Films suitable for being used in such laser printers are e.g. the photographic films marketed by Agfa-Gevaert N.V. under the registered trade marks SCOPIX LT, available in the following film formats : 8×10 inch, 14×11 inch or 14×17 inch.

I claim:

1. A system for reproducing a medical image represented by a digital signal representation comprising an image acquisition station for providing a digital signal representation of a medical image, an image processing station for carrying out image processing on said digital signal representation;

a reproducing station connected to said processing station for generating a hard copy of said medical image, storage means for storing a file comprising a configuration parameter set, selection means for selecting from said file parameters that relate to the lay out of a text box to be printed on a hard copy of the medical image, control means for controlling the operation of the reproducing station so as to generate a hard copy of said medical image with a text box the lay out of which is controlled by the selected parameters.

2. A system for displaying a medical image represented by a digital signal representation comprising an image acquisition station for providing a digital signal representation of said medical image, an image processing station for carrying out image processing on said digital signal representation;

a display station connected to said processing station for generating a soft copy of a medical image, storage means for storing a file comprising a configuration parameter set, selection means for selecting from said file parameters that relate to the lay out of a text box to be displayed together with the soft copy of the medical image, control means for controlling the operation of the display station so as to generate a soft copy of said medical image with a text box the lay out of which is controlled by the selected parameters.

3. A system according to claim 1 wherein said image acquisition station comprises means for scanning a photostimulable phosphor wherein a radiation image has been stored with stimulating radiation, means for detecting light emitted upon stimulation, means for converting emitted light into a digital signal representation.

4. A system according to claim 3 wherein said image acquisition station comprises means for scanning a photostimulable phosphor wherein a radiation image has been stored with stimulating radiation, means for detecting light emitted upon stimulation, means for converting emitted light into a digital signal representation.

5. A method of reproducing a medical image represented by a digital signal representation and a text box comprising the steps of storing a file comprising parameters defining the lay out of a text box, selecting said parameters from said file, acquiring a digital signal representation of said image, processing said digital signal representation and generating a text box in accordance with said parameters, controlling the operation of a reproducing device so as to reproduce said medical image together with a text box the lay out of which is controlled by the selected parameters.

6. A method of displaying a medical image represented by a digital signal representation and a text box comprising the steps of storing a file comprising parameters defining the lay out of a text box, selecting said parameters from said file, acquiring a digital signal representation of said image, processing said digital signal representation and generating a text box in accordance with said parameters, controlling the operation of a display device so as to display said medical image together with a text box the lay out of which is controlled by the selected parameters.

\* \* \* \* \*